(12) United States Patent
Kawai et al.

(10) Patent No.: US 11,437,648 B2
(45) Date of Patent: Sep. 6, 2022

(54) NONAQUEOUS ELECTROLYTE SOLUTION FOR LITHIUM SECONDARY BATTERY

(71) Applicant: Toyota Jidosha Kabushiki Kaisha, Toyota (JP)

(72) Inventors: Toshiyuki Kawai, Nagoya (JP); Hiroto Asano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 341 days.

(21) Appl. No.: 16/745,669

(22) Filed: Jan. 17, 2020

(65) Prior Publication Data

US 2020/0243908 A1    Jul. 30, 2020

(30) Foreign Application Priority Data

Jan. 28, 2019  (JP) .............................. JP2019-012479

(51) Int. Cl.
*H01M 10/0567* (2010.01)
*H01M 10/0525* (2010.01)
*H01M 10/0568* (2010.01)

(52) U.S. Cl.
CPC ... *H01M 10/0567* (2013.01); *H01M 10/0525* (2013.01); *H01M 10/0568* (2013.01); *H01M 2300/0025* (2013.01)

(58) Field of Classification Search
CPC ......... H01M 10/0525; H01M 10/0567; H01M 10/0568; H01M 2300/0025
See application file for complete search history.

(56) References Cited

U.S. PATENT DOCUMENTS

| 2006/0188787 | A1 | 8/2006 | Nakanishi et al. |
| 2020/0020987 | A1* | 1/2020 | Morisawa ......... H01M 10/0568 |
| 2020/0203768 | A1* | 6/2020 | Fujiyama ............ H01M 10/052 |
| 2021/0126288 | A1 | 4/2021 | Fujiyama et al. |

FOREIGN PATENT DOCUMENTS

| JP | 2006-236653 A | 9/2006 |
| JP | 2016-051600 A | 4/2016 |
| JP | 2018-056066 A | 4/2018 |
| WO | 2019039346 A1 | 2/2019 |
| WO | WO-2020088664 A1 * | 5/2020 .......... H01M 10/052 |

* cited by examiner

*Primary Examiner* — Carlos Barcena
(74) *Attorney, Agent, or Firm* — Dinsmore & Shohl LLP

(57) ABSTRACT

Provided is a nonaqueous electrolyte solution to which lithium tetraborate is added, for a lithium secondary battery, the nonaqueous electrolyte solution being capable of reducing the resistance of a lithium secondary battery. A nonaqueous electrolyte solution for a lithium secondary battery disclosed herein contains lithium tetraborate as a first additive, and a difluorophosphate salt as a second additive.

2 Claims, 2 Drawing Sheets

NONAQUEOUS ELECTROLYTE SOLUTION FOR LITHIUM SECONDARY BATTERY

CROSS-REFERENCE TO RELATED APPLICATIONS

The present application claims priority to Japanese Patent Application No. 2019-012479 filed on Jan. 28, 2019, the entire contents of which are incorporated herein by reference.

TECHNICAL FIELD

The present teaching relates to a nonaqueous electrolyte solution for a lithium secondary battery.

TECHNICAL BACKGROUND

In recent years, lithium secondary batteries are used as a portable power source for a personal computer or a mobile terminal, and a power source for driving a vehicle such as an electric vehicle (EV), a hybrid vehicle (HV), or a plug-in hybrid vehicle (PHV).

Further increases in the performance of lithium secondary batteries are sought as a result of its widespread use. An example of an approach for increasing the performance of the lithium secondary battery includes an improvement in nonaqueous electrolyte solution by the use of an additive. As an example, it is known that lithium tetraborate ($Li_2B_4O_7$) is used as an additive for a nonaqueous electrolyte solution for a lithium secondary battery. For example, Japanese Patent Application Publication No. 2006-236653 describes that it is possible to prevent gas generation during storage at high temperatures by adding lithium tetraborate to the nonaqueous electrolyte solution. In addition, Japanese Patent Application Publication No. 2016-051600 describes that, by adding lithium tetraborate to the nonaqueous electrolyte solution, it is possible to increase the solubility of an electrolyte in the nonaqueous electrolyte solution to reduce the resistance of a battery, and it is possible for the battery to maintain high capacity even when charge and discharge are repeated.

SUMMARY

However, as a result of elaborate studies conducted by the present inventors, it has been found that, in the case where lithium tetraborate is added to the nonaqueous electrolyte solution, it is possible to reduce the resistance of the battery, but there is still room for improvement in the reduction of the resistance thereof.

To cope with this, the present teaching provides a nonaqueous electrolyte solution to which lithium tetraborate is added, for a lithium secondary battery, the nonaqueous electrolyte solution being capable of reducing the resistance of a lithium secondary battery.

A nonaqueous electrolyte solution for a lithium secondary battery disclosed herein contains lithium tetraborate as a first additive, and a difluorophosphate salt as a second additive.

By using the nonaqueous electrolyte solution having the above configuration for a lithium secondary battery, it is possible to reduce the resistance of the lithium secondary battery.

In an aspect of the nonaqueous electrolyte solution for a lithium secondary battery disclosed herein, the content of lithium tetraborate in the nonaqueous electrolyte solution is not less than 0.05 mass % and not more than 1.0 mass %.

According to the above configuration, an especially high effect of reducing the resistance of the lithium secondary battery is provided.

In an aspect of the nonaqueous electrolyte solution for a lithium secondary battery disclosed herein, the nonaqueous electrolyte solution for a lithium secondary battery contains $LiPF_6$ and lithium bis(fluorosulfonyl)imide as an electrolyte salt.

According to the above configuration, a further enhanced effect of reducing the resistance of the lithium secondary battery is provided.

In the above aspect, the content of lithium bis(fluorosulfonyl)imide in the electrolyte salt is not less than 16.6 mol %.

According to the above configuration, a significantly enhanced effect of reducing the resistance of the lithium secondary battery is provided.

DETAILED DESCRIPTION

Figure 1:
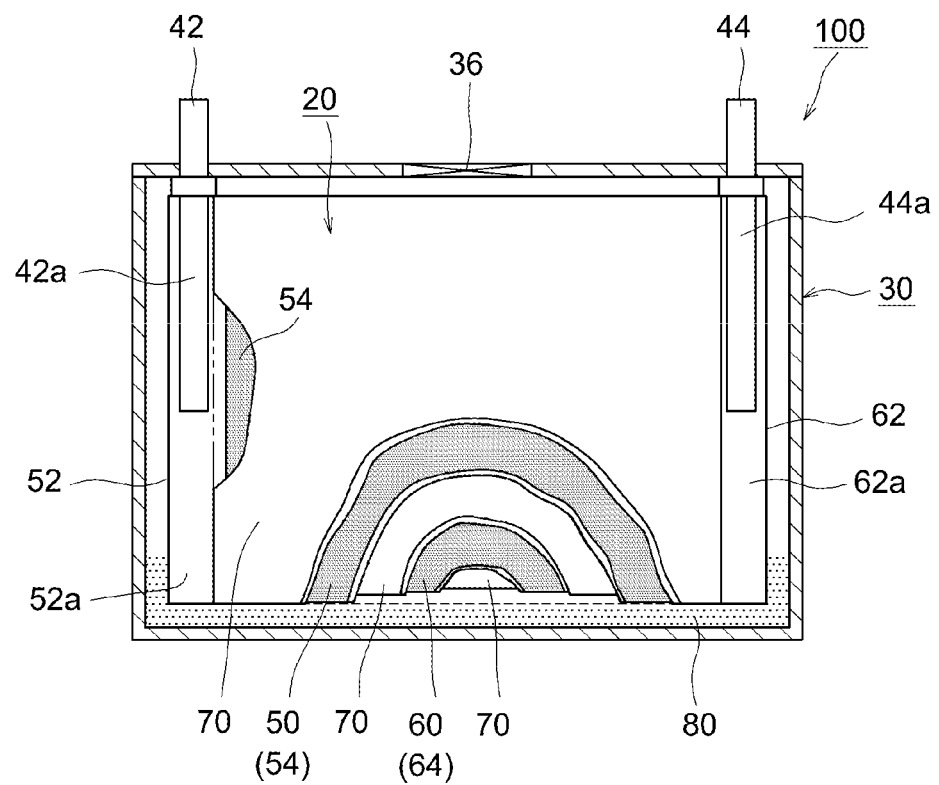
FIG. 1 is a cross-sectional view schematically showing the internal structure of a lithium secondary battery which uses a nonaqueous electrolyte solution according to an embodiment of the present teaching.

Hereinbelow, an embodiment according to the present teaching will be described with reference to the drawings. It should be noted that any features other than matters specifically mentioned in the present specification and that may be necessary for carrying out the present teaching (for example, the general configuration of the nonaqueous electrolyte solution for a lithium secondary battery and manufacturing process thereof which do not characterize the present teaching) can be understood as design matters for a person skilled in the art which are based on the related art. The present teaching can be implemented based on contents disclosed in the present specification and common general technical knowledge in the related art.

In the present specification, the "secondary battery" denotes a storage device which can be charged and discharged repeatedly, and is a term which includes power storage elements such as a so-called storage battery and an electric double-layer capacitor.

In addition, in the present specification, the "lithium secondary battery" denotes a secondary battery in which a lithium ion is used as a charge carrier, and charge and discharge are implemented by movement of an electric charge carried by the lithium ion between positive and negative electrodes.

A nonaqueous electrolyte solution for a lithium secondary battery according to the present embodiment contains lithium tetraborate ($Li_2B_4O_7$) as a first additive, and a difluorophosphate salt as a second additive.

As a result of elaborate studies conducted by the present inventors, it has been found that, as indicated by results of examples and comparative examples described later, by using lithium tetraborate and a difluorophosphate salt in combination as additives, the resulting resistance reduction effect exceeds a sum of a resistance reduction effect obtained only by lithium tetraborate and a resistance reduction effect obtained only by a difluorophosphate salt. That is, it has been found that the combination of lithium tetraborate and a difluorophosphate salt exhibit synergistic effects in resistance reduction.

It is difficult to achieve both of an improvement in initial resistance (resistance reduction) and durability which means that characteristics do not change significantly even after charge and discharge are repeated in a high temperature environment because a factor for the resistance reduction and a factor for the durability are different. However, according to the nonaqueous electrolyte solution for a lithium secondary battery according to the present embodiment, capacity degradation is reduced and resistance increase is remarkably reduced even after a battery using the nonaqueous electrolyte solution therefor is repeatedly charged and discharged in a high temperature environment.

As a result of the analysis conducted by the present inventors on the battery which uses the nonaqueous electrolyte solution for a lithium secondary batter according to the present embodiment, it has been confirmed that a film is formed on an electrode and, by X-ray photoelectron spectroscopy (XPS) analysis, it has been confirmed that boron derived from lithium tetraborate and phosphorus derived from the difluorophosphate salt are present in the film. From this, it seems that, in the electrode, the difluorophosphate salt or its degradant is incorporated in a relatively strong film obtained from lithium tetraborate, and a stronger hybrid film having lower resistance is thereby formed. In addition, it seems that, by the hybrid film, the effect of significantly reducing initial resistance is obtained, and a resistance increase prevention effect when charge and discharge are repeated in a high temperature environment is obtained.

The content of lithium tetraborate in the nonaqueous electrolyte solution is not particularly limited, and, in embodiment, the content thereof is not less than 0.01 mass % and not more than 2.5 mass %, not less than 0.05 mass % and not more than 1.0 mass %, or even not less than 0.1 mass % and not more than 0.5 mass % because a resistance reduction effect is especially high.

A difluorophosphate salt is a salt having a cation represented by $M^+$ and an anion represented by $PO_2F_2^-$. Examples of the cation represented by $M^+$ include cations of alkali metals such as Li, Na, and K and an ammonium cation. In embodiments, the difluorophosphate salt is an alkali metal salt. In embodiments, the alkali metal is Li or Na. In embodiments, the alkali metal is Li.

The content of the difluorophosphate salt in the nonaqueous electrolyte solution is not particularly limited, and, in embodiments, the content thereof is not less than 0.01 mass % and not more than 5 mass %, or not less than 0.1 mass % and not more than 3.0 mass % because the resistance reduction effect is especially high.

The nonaqueous electrolyte solution for a lithium secondary battery according to the present embodiment may contain a nonaqueous solvent and an electrolyte salt.

As the nonaqueous solvent, known nonaqueous solvents which are used in the nonaqueous electrolyte solution for a lithium ion secondary battery may be used without particular limitations. In embodiments, carbonates, ethers, esters, nitriles, sulfones, and lactones may be used as the nonaqueous solvents. In embodiments, the nonaqueous solvent may include carbonates. Examples of the carbonates include ethylene carbonate (EC), propylene carbonate (PC), diethyl carbonate (DEC), dimethyl carbonate (DMC), and ethyl methyl carbonate (EMC). The above carbonate can be used alone, or two or more carbonates can be used in combination.

As the electrolyte salt, known electrolyte salts which are used in the nonaqueous electrolyte solution for a lithium ion secondary battery may be used without particular limitations. In embodiments, a lithium salt, such as a lithium salt containing a fluorine atom, may be used. Examples of the lithium salt include $LiPF_6$, $LiBF_4$, lithium bis(fluorosulfonyl)imide (LiFSI), and lithium bis(trifluoromethane)sulfonimide (LiTFSI). The above lithium salt can be used alone, or two or more lithium salts can be used in combination.

In embodiments, the electrolyte salt contains at least $LiPF_6$, or the electrolyte salt contains $LiPF_6$ and LiFSI because the resistance reduction effect is especially high. In the case where $LiPF_6$ and LiFSI are used in combination as the electrolyte salt, from a viewpoint of higher resistance reduction effect, in embodiments, the content of LiFSI in the electrolyte salt is not less than 16 mol %, not less than 30 mol %, or even not less than 60 mol %. On the other hand, in embodiments, the content of LiFSI in the electrolyte salt is not more than 95 mol %, or not more than 85 mol %.

It should be noted that the reason why the higher resistance reduction effect is obtained by using, as the electrolyte salt, $LiPF_6$ and LiFSI in combination is probably that part of LiFSI is incorporated in a film and the film is thereby further modified.

The concentration of the electrolyte salt is not particularly limited as long as the effect of the present teaching is obtained. From the viewpoint of allowing the electrolyte salt to appropriately exercise the function as the electrolyte salt, in embodiments, the concentration of the electrolyte salt in the nonaqueous electrolyte solution is not less than 0.5 mol/L and not more than 3 mol/L, or not less than 0.8 mol/L and not more than 1.6 mol/L.

It should be noted that the nonaqueous electrolyte solution for a lithium secondary battery according to the present embodiment may contain various additives, for example, a gas generating agent such as biphenyl (BP) or cyclohexylbenzene (CHB); a film forming agent; a disperser; and a thickening agent as long as the effect of the present teaching is not significantly spoiled.

The nonaqueous electrolyte solution for a lithium secondary battery according to the present embodiment can be used in the lithium secondary battery according to a known method. It is possible to reduce the resistance of the lithium secondary battery by using the nonaqueous electrolyte solution for a lithium secondary battery according to the present embodiment in the lithium secondary battery. In addition, it is possible to improve the durability (i.e., resistance to capacity degradation and resistance increase prevention performance) of the lithium secondary battery when charge and discharge are repeated in a high temperature environment. An improvement in resistance increase prevention performance is particularly remarkable.

Hereinbelow, the lithium secondary battery including the nonaqueous electrolyte solution for a lithium secondary battery according to the present embodiment will be described with reference to the drawings by using an example. However, the lithium secondary battery is not limited to the example described below. In the following drawings, members and portions which have the same functions are designated by the same reference numerals. Further, the dimensional relationship (length, width, thickness, and the like) in the individual drawings may not necessarily reflect the actual dimensional relationship A lithium secondary battery 100 shown in FIG. 1 is a sealed battery constructed by accommodating a flat wound electrode body 20 and a nonaqueous electrolyte solution 80 in a flat square battery case (i.e., an outer container) 30. The battery case 30 is provided with a positive electrode terminal 42 and a negative electrode terminal 44 for external connection, and a thin safety valve 36 which is set to release internal pressure when the internal pressure in the battery case 30 rises to a level equal to or higher than a predetermined level. In addition, the battery case 30 is provided with an injection hole (not shown) for injecting the nonaqueous electrolyte solution 80. The positive electrode terminal 42 is electrically connected to a positive electrode current collector plate 42a. The negative electrode terminal 44 is electrically connected to a negative electrode current collector plate 44a. As the material of the battery case 30, a metal material which is light and excellent in thermal conductivity such as aluminum is used.

Figure 2:
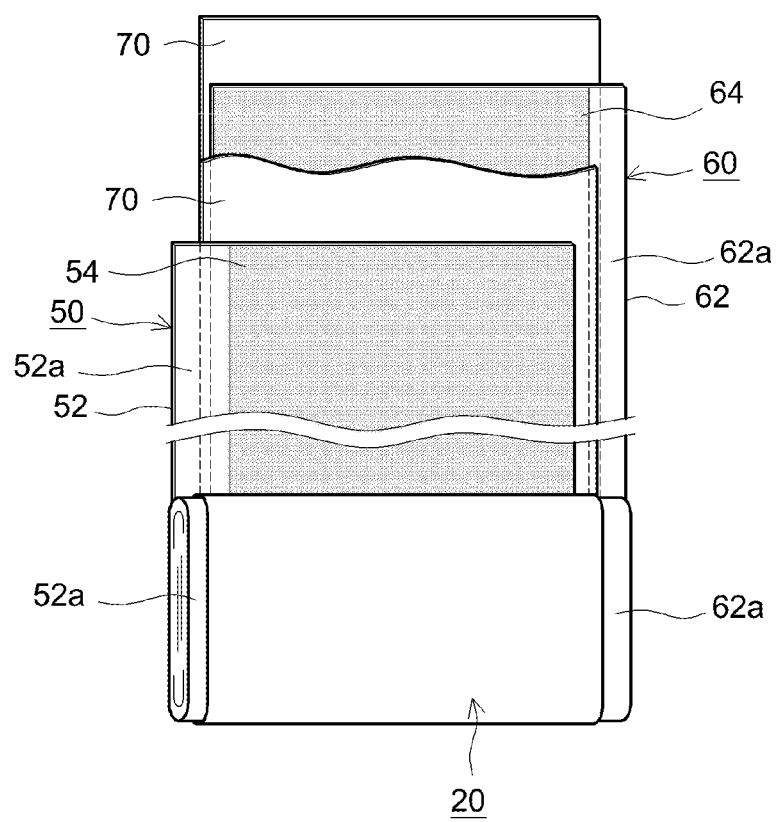
FIG. 2 is a schematic view showing the configuration of a wound electrode body of the lithium secondary battery which uses the nonaqueous electrolyte solution according to the embodiment of the present teaching.

As shown in FIG. 1 and FIG. 2, the wound electrode body 20 has a form in which a positive electrode sheet 50 in which a positive electrode active material layer 54 is formed along a longitudinal direction on one surface or both surfaces (both surfaces in this case) of a long positive electrode current collector 52, and a negative electrode sheet 60 in which a negative electrode active material layer 64 is formed along the longitudinal direction on one surface or both surfaces (both surfaces in this case) of a long negative electrode current collector 62 are stacked via two long separator sheets 70, and are wound in the longitudinal direction. It should be noted that the positive electrode current collector plate 42a and the negative electrode current collector plate 44a are bonded to a positive electrode active material layer non-formation portion 52a (i.e., a portion in which the positive electrode active material layer 54 is not formed and the positive electrode current collector 52 is exposed) and a negative electrode active material layer non-formation portion 62a (i.e., a portion in which the negative electrode active material layer 64 is not formed and the negative electrode current collector 62 is exposed) which are formed so as to extend outward from both ends of the wound electrode body 20 in a winding axis direction (i.e., a sheet width direction orthogonal to the above longitudinal direction), respectively.

As the positive electrode sheet 50 and the negative electrode sheet 60, the positive and negative electrode sheets similar to those used in the conventional lithium secondary battery may be used without particular limitations. Forms thereof are shown below.

An example of the positive electrode current collector 52 constituting the positive electrode sheet 50 includes aluminum foil or the like. Examples of a positive electrode active material contained in the positive electrode active material layer 54 include lithium transition metal oxides (e.g., $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like), and lithium transition metal phosphate compounds (e.g., $LiFePO_4$ and the like). The positive electrode active material layer 54 can contain components other than the active material such as a conductive material and a binder. As the conductive material, for example, carbon black such as acetylene black (AB) or the like, and other carbon materials (e.g., graphite and the like) can be used. As the binder, for example, polyvinylidene fluoride (PVDF) or the like may be used.

An example of the negative electrode current collector 62 constituting the negative electrode sheet 60 includes copper foil or the like. As a negative electrode active material contained in the negative electrode active material layer 64, carbon materials such as graphite, hard carbon, and soft carbon may be used. The negative electrode active material layer 64 can contain components other than the active material such as a binder and a thickening agent. As the binder, for example, styrene butadiene rubber (SBR) or the like may be used. As the thickening agent, for example, carboxymethyl cellulose (CMC) or the like may be used.

An example of the separator sheet 70 includes a porous sheet (film) formed of a resin such as polyethylene (PE), polypropylene (PP), polyester, cellulose, or polyamide. Such a porous sheet may have a single layer structure, or may also have a multilayer structure having two or more layers (e.g., a three-layer structure in which PP layers are stacked on both surfaces of a PE layer). A heat resistance layer (HRL) may be provided on the surface of the separator sheet 70.

As the nonaqueous electrolyte solution 80, the nonaqueous electrolyte solution for a lithium secondary battery according to the present embodiment described above is used. It should be noted that FIG. 1 does not show the exact amount of the nonaqueous electrolyte solution 80 injected into the battery case 30.

The thus configured lithium secondary battery 100 can be used for various applications. An example of the application includes a drive power source mounted on a vehicle such as an electric vehicle (EV), a hybrid vehicle (HV), or a plug-in hybrid vehicle (PHV). The lithium secondary battery 100 can also be used in the form of a battery pack in which a plurality of lithium secondary batteries are connected in series and/or in parallel.

It should be noted that the square lithium secondary battery 100 including the flat wound electrode body 20 has been described as the example. However, the lithium secondary battery can also be configured as a lithium secondary battery including a stacked-type electrode body. In addition, the lithium secondary battery can also be configured as a cylindrical lithium secondary battery or a laminate-type lithium secondary battery.

Hereinbelow, while examples related to the present teaching will be described, it is not intended to limit the present teaching to such examples.

Preparation of Nonaqueous Electrolyte Solution

As a nonaqueous solvent, a mixed solvent containing ethylene carbonate (EC) and ethyl methyl carbonate (EMC) at a volume ratio of 30:70 was prepared. A nonaqueous electrolyte solution of each of examples and comparative examples was prepared by adding an electrolyte salt shown in Table 1 to the mixed solvent at a concentration shown in Table 1, and adding an additive (I) and an additive (II) shown in Table 1 to the mixed solvent at contents shown in Table 1.

Production of Lithium Secondary Battery for Evaluation $LiNi_{1/3}Co_{1/3}Mn_{1/3}O_2$ (LNCM) serving as positive electrode active material powder, acetylene black (AB) serving as a conductive material, and polyvinylidene fluoride (PVdF) serving as a binder were mixed with N-methyl pyrrolidone (NMP) at a mass ratio of LNCM:AB:PVdF=87: 10:3, and slurry for forming a positive electrode active material layer was thereby prepared. The slurry was applied to aluminum foil and was dried, and was then pressed until the density of a positive electrode active material layer became 2.3 g/cm³ by roll pressing, whereby a positive electrode sheet was produced.

As a negative electrode active material, a natural graphite-based material which has an average particle diameter (D50) of 10 μm and a specific surface area of 4.8 m²/g, and satisfies $C_0=0.67$ nm and $L_c=27$ nm was prepared. The natural graphite-based material (C), styrene butadiene rubber (SBR) serving as a binder, and carboxymethyl cellulose (CMC) serving as a thickening agent were mixed with ion-exchanged water at a mass ratio of C:SBR:CMC=98:1:1, and slurry for forming a negative electrode active material layer was thereby prepared. The slurry was applied to copper foil and was dried, and was then pressed by roll pressing, whereby a negative electrode sheet was produced.

In addition, as a separator sheet, a porous polyolefin sheet having a PP/PE/PP three-layer structure was prepared.

The produced positive electrode sheet and the produced negative electrode sheet were allowed to face each other via the separator sheet, and an electrode body was thereby produced.

A current collector was attached to the produced electrode body, and the electrode body was accommodated in a laminated case together with the nonaqueous electrolyte solution of each of examples and comparative examples. A lithium secondary battery for evaluation was obtained by sealing the laminated case.

Conditioning

Each of the produced lithium secondary batteries was placed in an environment of 25° C. Each lithium secondary battery was subjected to constant current charge at a current value of ⅓ C until 4.1 V was reached, and was then left standing for 10 minutes. Subsequently, each lithium secondary battery was subjected to constant current discharge at a current value of ⅓ C until 3.0 V was reached, and was then left standing for 10 minutes, whereby each lithium secondary battery was subjected to a conditioning process.

Measurement of Initial Battery Resistance

The State of Charge (SOC) of each conditioned lithium secondary battery was adjusted to 60%. The lithium secondary battery was placed in a temperature environment of 25° C., and was charged for 10 seconds. A charge current rate was set to 1 C, 3 C, 5 C, and 10 C, and the voltage of the lithium secondary battery was measured after the lithium secondary battery was charged at each current rate. An IV resistance was calculated from the current rate and a voltage change amount, and the average value of the IV resistance was determined and used as an initial battery resistance. The ratios of the initial resistances of other batteries in the case where the initial resistance of the lithium secondary battery in Comparative Example 1 was set to "1.00" were calculated. The results are shown in Table 1.

Evaluation of High Temperature Cycle Characteristics

Each conditioned lithium secondary battery was placed in an environment of 25° C. The lithium secondary battery was subjected to constant current-constant voltage charge (cut current: ⅕₀ C) at a current value of ⅓ C until 4.1 V was reached, and was left standing for 10 minutes. Subsequently, the lithium secondary battery was subjected to constant current discharge at a current value of ⅓ C until 3.0 V was reached. A discharge capacity at this point was measured, and the measured discharge capacity was used as an initial capacity.

Subsequently, each lithium secondary battery was placed in an environment of 70° C. A cycle of charge and discharge, which included constant current charge performed at 2 C until 4.1 V was reached and constant current discharge performed at 2 C until 3.0 V, was repeatedly performed 200 times. Thereafter, the discharge capacity was measured by the same method as that described above, and the discharge capacity at this point was used as a battery capacity after 200 cycles of charge and discharge. A capacity ratio represented by (battery capacity after 200 cycles of charge and discharge/initial capacity) was determined and used as an index of capacity degradation. The results are shown in Table 1. It should be noted that, the higher the capacity ratio becomes, the higher resistance to capacity degradation becomes.

In addition, a battery resistance was measured by the same method as that described above, and the battery resistance at this point was used as the battery resistance after 200 cycles of charge and discharge. A resistance ratio represented by (battery resistance after 200 cycles of charge and discharge/initial resistance) was determined and used as an index of resistance increase. The results are shown in Table 1. It should be noted that, the lower the resistance ratio becomes, the more excellent the resistance increase prevention performance becomes.

TABLE 1

| | Electrolyte Salt | | Additive (I) | | Additive (II) | | Initial Resistance | High Temperature Cycle Characteristics | |
| --- | --- | --- | --- | --- | --- | --- | --- | --- | --- |
| | Type | Concentration (mol/L) | Type | Content (mass %) | Type | Content (mass %) | Relative Value | Capacity Ratio | Resistance Ratio |
| Comparative Example 1 | $LiPF_6$ | 1.2 | — | — | — | — | 1.00 | 0.85 | 1.22 |
| Comparative Example 2 | $LiPF_6$/LiFSI | 0.4/0.8 | — | — | — | — | 0.98 | 0.86 | 1.20 |
| Comparative Example 3 | $LiPF_6$ | 1.2 | Lithium Tetraborate | 0.5 | — | — | 0.89 | 0.86 | 1.14 |
| Comparative Example 4 | $LiPF_6$ | 1.2 | — | — | $LiPO_2F_2$ | 1.0 | 0.94 | 0.88 | 1.15 |
| Comparative Example 5 | $LiPF_6$ | 1.2 | Trimethoxyboroxine | 0.5 | $LiPO_2F_2$ | 1.0 | 0.97 | 0.87 | 1.15 |
| Comparative Example 6 | $LiPF_6$ | 1.2 | Trimethyl Borate | 0.5 | $LiPO_2F_2$ | 1.0 | 1.12 | 0.84 | 1.25 |
| Example 1 | $LiPF_6$ | 1.2 | Lithium Tetraborate | 0.5 | $LiPO_2F_2$ | 1.0 | 0.81 | 0.91 | 1.02 |
| Example 2 | $LiPF_6$ | 1.2 | Lithium Tetraborate | 1.0 | $LiPO_2F_2$ | 1.0 | 0.87 | 0.89 | 1.10 |
| Example 3 | $LiPF_6$ | 1.2 | Lithium Tetraborate | 0.1 | $LiPO_2F_2$ | 1.0 | 0.83 | 0.89 | 1.07 |
| Example 4 | $LiPF_6$ | 1.2 | Lithium Tetraborate | 0.05 | $LiPO_2F_2$ | 1.0 | 0.88 | 0.89 | 1.12 |
| Example 5 | $LiPF_6$ | 1.2 | Lithium Tetraborate | 0.5 | $LiPO_2F_2$ | 0.1 | 0.82 | 0.90 | 1.07 |
| Example 6 | $LiPF_6$ | 1.2 | Lithium Tetraborate | 0.5 | $LiPO_2F_2$ | 3.0 | 0.82 | 0.90 | 1.04 |
| Example 7 | $LiPF_6$ | 1.2 | Lithium Tetraborate | 0.5 | $NaPO_2F_2$ | 1.0 | 0.81 | 0.90 | 1.03 |
| Example 8 | $LiPF_6$ | 1.2 | Lithium Tetraborate | 0.5 | $KPO_2F_2$ | 1.0 | 0.83 | 0.90 | 1.03 |
| Example 9 | $LiPF_6$/LiFSI | 0.4/0.8 | Lithium Tetraborate | 0.5 | $LiPO_2F_2$ | 1.0 | 0.74 | 0.91 | 1.02 |
| Example 10 | $LiPF_6$/LiFSI | 0.2/1.0 | Lithium Tetraborate | 0.5 | $LiPO_2F_2$ | 1.0 | 0.74 | 0.91 | 1.02 |
| Example 11 | $LiPF_6$/LiFSI | 0.8/0.4 | Lithium Tetraborate | 0.5 | $LiPO_2F_2$ | 1.0 | 0.77 | 0.91 | 1.03 |
| Example 12 | $LiPF_6$/LiFSI | 1.0/0.2 | Lithium Tetraborate | 0.5 | $LiPO_2F_2$ | 1.0 | 0.80 | 0.90 | 1.03 |
| Example 13 | $LiPF_6$/LiFSI | 0.4/0.8 | Lithium Tetraborate | 0.05 | $LiPO_2F_2$ | 1.0 | 0.80 | 0.90 | 1.09 |

From comparisons between Example 1 and Comparative Examples 1 and 3 to 6, it can be seen that both of the initial resistance and high temperature cycle characteristics are improved by using lithium tetraborate and a difluorophosphate salt in combination as additives. In particular, it can be seen that in Example 1 the initial resistance reduction effect was obtained which is larger than a sum of the initial resistance reduction effect only due to lithium tetraborate, which is grasped from a comparison between Comparative Example 3 and Comparative Example 1, and the initial resistance reduction effect only due to the difluorophosphate salt, which is grasped from a comparison between Comparative Example 4 and Comparative Example 1. In addition, in Example 1, it can be seen that the capacity ratio after the high temperature cycles is high and the resistance increase is remarkably small. Such effects of significantly improving the initial resistance and high temperature cycle characteristics were not observed in each of Comparative Examples 5 and 6 in which other boron-based additives were used. Although the reason for this is uncertain, this is probably because the difluorophosphate salt or its degradant was incorporated in a relatively strong film on an electrode, obtained from lithium tetraborate, and a stronger hybrid film having lower resistance was thereby formed.

From the results of Examples 1 to 4, it can be seen that, even when the addition amount of lithium tetraborate is changed, the effects of improving the initial resistance and high temperature cycle characteristics are obtained.

From the results of Examples 5 and 6, it can be seen that, even when the addition amount of the difluorophosphate salt is changed, the effects of improving the initial resistance and high temperature cycle characteristics are obtained.

From the results of Examples 7 and 8, it can be seen that, even when a cationic species of the difluorophosphate salt is changed, the effects of improving the initial resistance and high temperature cycle characteristics are obtained. From this, it seems that the effect of the difluorophosphate salt is provided by the difluorophosphate anion, and the effect is obtained irrespective of the cationic species.

From the results of Examples 9 to 13 and Comparative Example 2, in the case where $LiPF_6$ and lithium bis(fluorosulfonyl)imide (LiFSI) were used in combination as the electrolyte salt, the effects of improving the initial resistance and high temperature cycle characteristics were observed, and what was notable was that a further reduction effect of the initial resistance was observed. In addition, in Example 13, even when the addition amount of lithium tetraborate was reduced to 0.05 mass %, high improvement effects were maintained. This is an effect which was not observed in Comparative Example 2 in which $LiPF_6$ and LiFSI were simply used in combination as the electrolyte salt, and this is probably because, by mixing LiFSI, part of LiFSI was incorporated in the film, and the quality of the film was further improved.

In view of the foregoing, according to the nonaqueous electrolyte solution for a lithium secondary battery according to the present embodiment, it can be understood that it is possible to reduce the resistance of the lithium secondary battery. In addition, it can be understood that it is possible to improve high temperature cycle characteristics.

Although the examples of the present teaching have been described above in detail, these are merely examples and do not limit the scope of the claims. The art set forth in the claims includes various changes and modifications of the examples illustrated above.

What is claimed is:

1. A nonaqueous electrolyte solution for a lithium secondary battery, comprising:
    lithium tetraborate as a first additive;
    a difluorophosphate salt as a second additive; and
    $LiPF_6$ and lithium bis(fluorosulfonyl)imide as an electrolyte salt, wherein a content of lithium bis(fluorosulfonyl)imide in the electrolyte salt is not less than 16.6 mol %.

2. The nonaqueous electrolyte solution for a lithium secondary battery according to claim 1, wherein
    a content of lithium tetraborate in the nonaqueous electrolyte solution is not less than 0.05 mass % and not more than 1.0 mass %.

* * * * *